United States Patent
Yamada et al.

(10) Patent No.: US 8,022,110 B2
(45) Date of Patent: Sep. 20, 2011

(54) POROUS POLYIMIDE

(75) Inventors: Yasuharu Yamada, Kyoto (JP); Tomoyuki Suzuki, Toyota (JP); Jun Sakai, Kuwana (JP); Norihiro Tomokiyo, Kasugai (JP)

(73) Assignee: Ibiden Co., Ltd., Ogaki-shi (JP)

( * ) Notice: Subject to any disclaimer, the term of this patent is extended or adjusted under 35 U.S.C. 154(b) by 55 days.

(21) Appl. No.: 12/562,908

(22) Filed: Sep. 18, 2009

(65) Prior Publication Data
US 2010/0048745 A1    Feb. 25, 2010

Related U.S. Application Data

(63) Continuation of application No. PCT/JP08/55007, filed on Mar. 18, 2008.

(30) Foreign Application Priority Data

Mar. 19, 2007 (JP) ................. 2007-069881

(51) Int. Cl.
C08J 9/26 (2006.01)
C08L 9/08 (2006.01)

(52) U.S. Cl. ............... 521/61; 521/63; 521/83; 521/86; 521/155; 521/157; 521/184; 521/185

(58) Field of Classification Search .......... 521/61, 521/63, 83, 86, 155, 15, 157, 184, 185
See application file for complete search history.

(56) References Cited

U.S. PATENT DOCUMENTS

| | | | |
|---|---|---|---|
| 2002/0065390 A1 | 5/2002 | Kanada et al. | |
| 2004/0101626 A1 | 5/2004 | Kanada et al. | |
| 2007/0149759 A1 | 6/2007 | Yamada et al. | |

FOREIGN PATENT DOCUMENTS

| | | |
|---|---|---|
| JP | 2002-167434 A | 6/2002 |
| JP | 2003-26850 A | 1/2003 |
| JP | 2004-292537 A | 10/2004 |
| JP | 2005-68347 | 3/2005 |
| JP | A 2007-246772 | 9/2007 |
| TW | I267528 | 12/2006 |
| WO | WO 2005/123825 A2 | 12/2005 |
| WO | WO 2005/123825 A3 | 12/2005 |
| WO | WO2006/025327 | 3/2006 |

OTHER PUBLICATIONS

Laura L. Beecroft, et al., "Covalently Linked, Transparent Silica-Poly(imide) Hybrids", Polymers for Advanced Technologies, vol. 8, XP-000659359, May 1997, pp. 289-296.

Lizhong Jiang, et al. "A methodology for the preparation of nanoporous polyimide films with low dielectric constants", Thin Solid Films, vol. 510, pp. 241-246 (2006).

*Primary Examiner* — Irina S Zemel
(74) *Attorney, Agent, or Firm* — Oblon, Spivak, McClelland, Maier & Neustadt, L.L.P.

(57) ABSTRACT

A porous polyimide obtained by removing a silica phase from an organic-inorganic polymer hybrid having a molecule structure in which a polyimide phase and the silica phase are held together by covalent bond.

14 Claims, 4 Drawing Sheets

POROUS POLYIMIDE

This application is a continuation of the International Application No. PCT/JP2008/055007, filed Mar. 18, 2008, which claims the benefit under 35 U.S.C. §119(a)-(d) of Japanese Application 2007-069881, filed Mar. 19, 2007, the entireties of which are incorporated herein by reference.

TECHNICAL FIELD

The present invention relates to a porous polyimide.

BACKGROUND ART

Polyimides have been widely used as materials for various industrial parts because of their excellent electric properties (low dielectric constants), heat resistance, mechanical strength, chemical resistance, formability and so on. Recently, polyimides for any use have been demanded to have better properties than ever before. Especially, polyimides used as materials for electric parts have been demanded to exhibit better electric properties (low dielectric constants).

As polyimides used as materials for electric parts, which have excellent properties, various polyimides are conventionally proposed. Non-Patent Document 1 discloses one of the polyimides. Specifically, Non-Patent Document 1 discloses that a straight-chain porous polyimide having pores of prescribed size is attained by removing silica particles from a straight-chain polyimide obtained via sol-gel reaction and having silica particles-dispersed phase, through hydrofluoric acid treatment of the straight-chain polyimide. The thus resulting porous straight-chain polyimide is considered to exhibit excellent electric properties (low dielectric constants) due to the presence of pores.

However, the inventors of the present invention have conducted an intensive study of the porous polyimide disclosed in Non-Patent Document 1 and found that although an improvement of electric properties (low dielectric constants) is confirmed, there is a risk of remarkable deterioration in mechanical strength because of relatively large pores present in the polyimide. The porous polyimide disclosed in Non-Patent Document 1 is obtained by removing the silica particles from the straight-chain polyimide having silica particles-dispersed phases (hereinafter, called as silica particles-containing polyimide in this paragraph). In the silica particles-containing polyimide, polyimide molecules and silica particles are merely mixed. As is obvious from the description of Non-Patent Document 1, there are no particular chemical bonds between the polyimide molecules and the silica particles.

Meanwhile, in JP-A-2007-246772, the present inventors have previously proposed a hyperbranched polyimide-based hybrid material that is obtained by using a mixture including a hyperbranched polyamic acid, which is obtained by reaction of an aromatic tetracarboxylic dianhydride with an aromatic triamine, and inorganic oxide particles. The hyperbranched polyamic acid present in the mixture is imidized to obtain the hyperbranched polyimide, thereby obtaining the hyperbranched polyimide-based hybrid material. Further, in Patent Document 1 (WO06/25327 pamphlet), the present inventors have proposed a hyperbranched polyimide-based hybrid material comprising an organic-inorganic polymer hybrid having a composite structure in which a polyimide phase and a silica phase are held together by covalent bond.

Patent Document 1: WO06/25327 pamphlet
Non-Patent Document 1: L. Jiang et al., "A methodology for the preparation of nanoporous polyimide films with low dielectric constants", Thin Solid films, the U.S.A, Elsevier B.V., Jun. 3, 2006, Vol. 510, pp. 241-246

SUMMARY OF THE INVENTION

The present invention has been made in the light of the situation discussed above. It is therefore an object of the present invention to provide a porous polyimide having a new structure in which excellent low dielectric properties and sufficient mechanical strength are exhibited.

The present inventors have conducted intensive studies of the hyperbranched polyimide-based hybrid material that they had previously proposed, and found that a porous polyimide obtained by removing a silica phase from an organic-inorganic polymer hybrid having a molecular structure in which a polyimide phase and a silica phase are held together by covalent bond has excellent low dielectric properties and sufficient mechanical strength. This finding leads to the completion of the present invention.

Thus, the object of the present invention is a porous polyimide which is obtained by removing a silica phase from an organic-inorganic polymer hybrid having a molecule structure in which a polyimide phase and the silica phase are held together by covalent bond.

In the porous polyimide of the present invention, it is advantageous that the polyimide phase has a dendritic structure in at least a part thereof.

According to a preferable aspect of the present invention, the organic-inorganic polymer hybrid is obtained through imidization of a polyamic acid-silica hybrid in which a polyamic acid having a hydroxyl group and/or an alkoxysilyl group in at least a part of a plurality of end groups thereof and silica particles which is equivalent to the silica phase are held together by covalent bond.

According to another preferable aspect of the present invention, the polyamic acid is obtained by reaction of a tetracarboxylic dianhydride with a diamine and/or a triamine and with a silane coupling agent having an alkoxysilyl group.

According to a favorable aspect of the present invention, the organic-inorganic polymer hybrid is formed through imidization of a reaction product obtained via sol-gel reaction of a polyamic acid having a hydroxyl group and/or an alkoxysilyl group in at least a part of a plurality of end groups with an alkoxysilane compound in the presence of water.

According to another favorable aspect of the present invention, the organic-inorganic polymer hybrid is obtained via sol-gel reaction of a polyimide with an alkoxysilane compound in the presence of water, the polyimide being obtained through imidization of a polyamic acid having a hydroxyl group and/or an alkoxysilyl group in at least a part of a plurality of end groups thereof.

According to a still another favorable aspect of the present invention, the polyamic acid is obtained by reaction of a tetracarboxylic dianhydride with a diamine and/or a triamine and with a silane coupling agent having an alkoxysilyl group.

Another object of the present invention is a polyimide film comprising the porous polyimide according to the above aspects.

The porous polyimide of the present invention is obtained by using an organic-inorganic polymer hybrid which has a molecular structure in which a polyimide phase and a silica phase are held together by covalent bond. The silica phase contained in the organic-inorganic polymer hybrid is extremely fine (nanoscale), so that, by removing the silica phase from the organic-inorganic polymer hybrid, pores finer (nanoscale) than that of conventional porous polyimides can be effectively formed. As a result, the porous polyimide of the present invention has a novel structure and exhibits sufficient mechanical strength in addition to low dielectric constant.

In the present invention, when the polyimide phase of the organic-inorganic polymer hybrid includes a dendritic structure in at least a part thereof, the organic-inorganic polymer hybrid molecule advantageously has a three dimensional structure and consequently can include a larger number of silica phases. Accordingly, by removing the larger number of silica phases, a porous polyimide exhibiting more excellent low dielectric constant can be obtained. Even when a large number of silica phases is removed, the resulting porous polyimide has sufficient mechanical strength, because the polyimide phase has a three dimensional structure.

Further, when a polyamic acid which is synthesized by reacting both of a triamine and a diamine with a tetracarboxylic dianhydride is used as a polyamic acid which is a precursor used in the synthesis of the organic-inorganic polymer hybrid, the polyamic acid has a dendritic structure and a straight-chain structure in a molecule thereof. As a result, viscosity of the polyamic acid is advantageously improved. Consequently, when polyimide film is produced by using such a polyamic acid, thickness thereof can be increased, for example.

DETAILED DESCRIPTION OF THE INVENTION

As described above, the porous polyimide of the present invention is obtained by removing a silica phase from an organic-inorganic polymer hybrid which has a molecular structure in which a polyimide phase and a silica phase are held together by covalent bond. In the production of such a porous polyimide, an organic-inorganic polymer hybrid having a molecular structure in which a polyimide phase and a silica phase are held together by covalent bond is initially synthesized. The synthesis methods of the organic-inorganic polymer hybrid are classified roughly according to introduction methods of the silica phase.

a) Synthesis Method of an Organic-Inorganic Polymer Hybrid Using Silica Particles The following is a detailed description of a synthesis method of an organic-inorganic polymer hybrid using silica particles, in which 1) first, a polyamic acid is synthesized by reaction of a tetracarboxylic dianhydride with a diamine and/or a triamine, 2) secondly, the resulting polyamic acid is reacted with a silane coupling agent having an alkoxysilyl group to obtain a polyamic acid having a hydroxyl group and/or an alkoxysilyl group in at least a part of a plurality of end groups, and 3) then, the polyamic acid having modified end groups and silica particles is used to synthesize an organic-inorganic polymer hybrid.

Any known tetracarboxylic dianhydrides may be used for synthesizing a polyamic acid. Any one or two of the known tetracarboxylic dianhydrides may be appropriately selected and used, depending on the intended porous polyimide.

Specifically, examples of tetracarboxylic dianhydrides include aromatic tetracarboxylic dianhydride such as pyromellitic dianhydride (PMDA), oxydiphthalic dianhydride (ODPA), 3,3',4,4'-benzophenone tetracarboxylic dianhydride (BTDA), 3,3',4,4'-diphenylsulfone tetracarboxylic dianhydride (DSDA), 4,4'-(hexafluoroisopropylidene)diphthalic dianhydride (6FDA), 2,2'-bis[(dicarboxyphenoxy)phenyl] propane dianhydride (BSAA), 3,3',4,4'-biphenyltetracarboxylic dianhydride (BPDA), 2,3,3',4'-biphenyltetracarboxylic dianhydride, bis(3,4-dicarboxyphenyl)ether dianhydride, bis(3,4-dicarboxyphenyl)sulfide dianhydride, bis(3,4-dicarboxyphenyl)sulfone dianhydride, bis(3,4-dicarboxyphenyl)methane dianhydride, 2,2-bis(3,4-dicarboxyphenyl)propane dianhydride, 2,2-bis(3,4-dicarboxyphenyl)-1,1,1,3,3,3-hexafuluoropropane dianhydride, 1,3-bis(3,4-dicarboxyphenoxy)benzene dianhydride, 1,4-bis(3,4-dicarboxyphenoxy)benzene dianhydride, 4,4'-bis(3,4-dicarboxyphenoxy)biphenyl dianhydride, 2,3,6,7-naphtalenetetracarboxylic dianhydride, and 1,4,5,8-naphtalenetetracarboxylic dianhydride. Examples of tetracarboxylic dianhydrides further include aliphatic tetracarboxylic dianhydrides such as butan-1,2,3,4-tetracarboxylic dianhydride, pentane-1,2,4,5-tetracarboxylic dianhydride, cyclobutanetetracarboxylic dianhydride, cyclopentane-1,2,3,4-tetracarboxylic dianhydride, cyclohexane-1,2,4,5-tetracarboxylic dianhydride, cyclohex-1-ene-2,3,5,6-tetracarboxylic dianhydride, 3-ethylcyclohex-1-ene-3-(1,2),5,6-tetracarboxylic dianhydride, 1-methyl-3-ethylcyclohexane-3-(1,2),5,6-tetracarboxylic dianhydride, 1-methyl-3-ethylcyclohex-1-ene-3-(1,2),5,6-tetracarboxylic dianhydride, 1-ethylcyclohexane-1-(1,2),3,4-tetracarboxylic dianhydride, 1-propylcyclohexane-1-(2,3),3,4,tetracarboxylic dianhydride, 1,3-dipropylcyclohexane-1-(2,3),3-(2,3)-tetracarboxylic dianhydride, dicyclohexyl-3,4,3',4'-tetracarboxylic dianhydride, bicyclo[2.2.1]heptane-2,3,5,6-tetracarboxylic dianhydride, bicyclo[2.2.2]octane-2,3,5,6-tetracarboxylic dianhydride, and bicyclo[2.2.2]oct-7-ene-2,3,5,6-tetracarboxylic dianhydride.

The hyperbranched polyamic acid having a dendritic structure is obtained by reaction of an aromatic tetracarboxylic dianhydride ($A_2$) with a triamine ($B_3$), because of $A_2+B_3$ polycondensation. The advantages of the present invention and excellent transparency of the intended porous polyimide can be obtained by using such hyperbranched polyamic acid. In the present specification, the term "hyperbranched polyamic acid (hyperbranched polyimide)" is to be understood to refer to not only a polyamic acid (polyimide) having entirely dendritic structure, but also to a polyamic acid (polyimide) having partially dendritic structure. Further, it is to be understood that, in the present specification, the term "polyamic acid (polyimide)" includes hyperbranched polyamic acid (hyperbranched polyimide) except in a particular case.

In the present invention, any triamine may be used as long as it is a compound having three amino groups in a molecule thereof. Specifically, examples of triamines include aromatic triamine such as 1,3,5-triamino benzene, tris(3-aminophenyl)amine, tris(4-aminophenyl)amine, tris(3-aminophenyl)benzene, tris(4-aminophenyl)benzene, 1,3,5-tris(3-aminophenoxy)benzene, 1,3,5-tris(4-aminophenoxy)benzene, 1,3,5-tris(4-aminophenoxy)triazine, 3,3',5-triaminobiphenyl, 3,3',5-triaminodiphenylether, 1,1-bis(4-aminophenyl)-1-(4-aminophenyl)ethane, 1,1-bis(4-aminophenyl)-1-(4-aminophenyl)-2,2,2-trifluoroethane, 2-amino-9,9-bis(4-aminophenyl)fluorene, and 2-amino-9,9-bis[4-(4-aminophenoxy)phenyl]fluorene. Among them, one having a symmetrical molecule structure is preferably used in the present invention. More specifically described, a triamine compound having an amino group at 1,3,5 positions of a benzene ring or a triazine ring is favorably used. Examples of such aromatic triamines include 1,3,5-triamino benzene, tris(3-aminophenyl)amine, tris(4-aminophenyl)amine, tris(3-aminophenyl)benzene, tris(4-aminophenyl)benzene, 1,3,5-tris(3-aminophenoxy)benzene, 1,3,5-tris(4-aminophenoxy)benzene, and 1,3,5-tris(4-aminophenoxy)triazine.

In the present invention, together with the above triamine or instead of the above triamine, a diamine may be used in the synthesis of the polyamic acid. When the above triamine is used together with the diamine, the resulting polyamic acid molecule has a straight-chain structure (a straight-chain part) in the molecule while having a dendritic structure as a basic. Accordingly, viscosity of the polyamic acid is improved compared to the hyperbranched polyamic acid obtained by using only triamine. Therefore, in the production of a film material by using such a polyamic acid, thickness thereof can be easily increased. However, it is to be noted that when the content of diamine is excessively high relative to that of triamine, or only diamine is used, silica phase content in an organic-inorganic polymer hybrid is sometimes necessary to be limited in order to secure transparency of the intended porous polyimide.

Examples of diamines used in the present invention include aromatic diamine such as phenylenediamine, diaminodiphenyl methane, diaminodiphenylether, diaminodiphenyl, diaminobenzophenone, 2,2-bis[(4-aminophenoxy)phenyl]propane, bis[4-aminophenoxyphenyl]sulfone, 2,2-bis[(4-aminophenoxy)phenyl]hexafluoropropane, bis(4-aminophenoxy)benzene, 4,4'-[phenylenebis(1-methylethylidene)]bisaniline, 2,2-bis(4-aminophenyl)hexafluoropropane, 9,9-bis(aminophenyl)fluorene, 1,3-bis(3-aminophenoxy)benzene, 4,4-bis(3-aminophenoxy)biphenyl, 3,3'-diaminobenzophenone, 4,4'-diaminodiphenyl ether, 1,3-bis(3-(3-aminophenoxy)phenoxy)benzene, 1,3-bis(3-(4-aminophenoxy)phenoxy)benzene, 5,7-diamino-1,1,4,6-tetramethylindene, 1,3-bis(4-(3-aminophenoxy)phenoxy)benzene, 1,3-bis(3-(2-aminophenoxy)phenoxy)benzene, 1,3-bis(4-(2-aminophenoxy)phenoxy)benzene, 1,3-bis(2-(2-aminophenoxy)phenoxy)benzene, 1,3-bis(2-(3-aminophenoxy)phenoxy)benzene, 1,3-bis(2-(4-aminophenoxy)phenoxy)benzene, 1,4-bis(3-(3-aminophenoxy)phenoxy)benzene, 1,4-bis(3-(4-aminophenoxy)phenoxy)benzene, 1,4-bis(3-(2-aminophenoxy)phenoxy)benzene, 1,4-bis(4-(3-aminophenoxy)phenoxy)benzene, 1,4-bis(4-(2-aminophenoxy)phenoxy)benzene, 1,4-bis(2-(2-aminophenoxy)phenoxy)benzene, 1,4-bis(2-(3-aminophenoxy)phenoxy)benzene, 1,4-bis(2-(4-aminophenoxy)phenoxy)benzene, 1,2-bis(3-(3-aminophenoxy)phenoxy)benzene, 1,2-bis(3-(4-aminophenoxy)phenoxy)benzene, 1,2-bis(3-(2-aminophenoxy)phenoxy)benzene, 1,2-bis(4-(4-aminophenoxy)phenoxy)benzene, 1,2-bis(4-(3-aminophenoxy)phenoxy)benzene, 1,2-bis(4-(2-aminophenoxy)phenoxy)benzene, 1,2-bis(2-(2-aminophenoxy)phenoxy)benzene, 1,2-bis(2-(3-aminophenoxy)phenoxy)benzene, 1,2-bis(2-(4-aminophenoxy)phenoxy)benzene, 1,3-bis(3-(3-aminophenoxy)phenoxy)-2-methylbenzene, 1,3-bis(3-(4-aminophenoxy)phenoxy)-4-methylbenzene, 1,3-bis(4-(3-aminophenoxy)phenoxy)-2-ethylbenzene, 1,3-bis(3-(2-aminophenoxy)phenoxy)-5-sec-butylbenzene, 1,3-bis(4-(3-aminophenoxy)phenoxy)-2,5-dimethylbenzene, 1,3-bis(4-(2-amino-6-methylphenoxy)phenoxy)benzene, 1,3-bis(2-(2-amino-6-ethylphenoxy)phenoxy)benzene, 1,3-bis(2-(3-aminophenoxy)-4-methylphenoxy)benzene, 1,3-bis(2-(4-aminolphenoxy)-4-tert-butylphenoxy)benzene, 1,4-bis(3-(3-aminophenoxy)-2,5-di-tert-butylphenoxy)benzene, 1,4-bis(3-(4-aminophenoxy)phenoxy)-2,3-dimethylbenzene, 1,4-bis(3-(2-amino-3-propylphenoxy)phenoxy)benzene, 1,2-bis(3-(3-(3-aminophenoxy)phenoxy)-4-methylbenzene, 1,2-bis(3-(4-aminophenoxy)phenoxy)-3-n-butylbenzene, 1,2-bis(3-(2-amino-3-propylphenoxy)phenoxy)benzene, 9,9-bis[4-(4-aminophenoxy)phenyl]fluorene, 9,9-bis[4-(aminophenoxy)-3-phenylphenyl]fluorene, 9,9-bis[4-(4-amino-2-methylphenoxy)phenyl]fluorene, 9,9-bis[4-(4-amino-2-ethylphenoxy)phenyl]fluorene, 9,9-bis[4-(4-amino-2-n-propylphenoxy)phenyl]fluorene, 9,9-bis[4-(4-amino-2-i-propylphenoxy)phenyl]fluorene, 9,9-bis[4-(4-amino-2-t-butylphenoxy)phenyl]fluorene, 9,9-bis[4-(4-amino-2-trifluoromethylphenoxy)phenyl]fluorene, 9,9-bis[4-(4-amino-3-methylphenoxy)phenyl]fluorene, 9,9-bis[4-(4-amino-3-ethylphenoxy)phenyl]fluorene, 9,9-bis[4-(4-amino-3-n-propylphenoxy)phenyl]fluorene, 9,9-bis[4-(4-amino-3-i-propylphenoxy)phenyl]fluorene, 9,9-bis[4-(4-amino-3-t-butylphenoxy)phenyl]fluorene, 9,9-bis[4-(4-amino-3-trifluoromethylphenoxy)phenyl]fluorene, 9,9-bis[4-(2-amino-3-methylphenoxy)phenyl]fluorene, 9,9-bis[4-(2-amino-4-methylphenoxy)phenyl]fluorene, 9,9-bis[4-(2-amino-5-methylphenoxy)phenyl]fluorene, 9,9-bis[4-(2-amino-6-methylphenoxy)phenyl]fluorene, 9,9-bis[4-(2-amino-3-ethylphenoxy)phenyl]fluorene, 9,9-bis[4-(2-amino-4-ethylphenoxy)phenyl]fluorene, 9,9-bis[4-(2-amino-5-ethylphenoxy)phenyl]fluorene, 9,9-bis[4-(2-amino-6-ethylphenoxy)phenyl]fluorene, 9,9-bis[4-(2-amino-3-n-propylphenoxy)phenyl]fluorene, 9,9-bis[4-(2-amino-4-n-propylphenoxy)phenyl]fluorene, 9,9-bis[4-(2-amino-5-n-propylphenoxy)phenyl]fluorene, 9,9-bis[4-(2-amino-6-n-propylphenoxy)phenyl]fluorene, 9,9-bis[4-(2-amino-3-i-propylphenoxy)phenyl]fluorene, 9,9-bis[4-(2-amino-4-i-propylphenoxy)phenyl]fluorene, 9,9-bis[4-(2-amino-5-i-propylphenoxy)phenyl]fluorene, 9,9-bis[4-(2-amino-6-i-propylphenoxy)phenyl]fluorene, 9,9-bis[4-(2-amino-3-t-butylphenoxy)phenyl]fluorene, 9,9-bis[4-(2-amino-4-t-butylphenoxy)phenyl]fluorene, 9,9-bis[4-(2-amino-5-t-butylphenoxy)phenyl]fluorene, 9,9-bis[4-(2-amino-6-t-butylphenoxy)phenyl]fluorene, 9,9-bis[4-(2-amino-3-trifluoromethylphenoxy)phenyl]fluorene, 9,9-bis[4-(2-amino-4-trifluoromethylphenoxy)phenyl]fluorene, 9,9-bis[4-(2-amino-5-trifluoromethylphenoxy)phenyl]fluorene, 9,9-bis[4-(2-amino-6-trifluoromethylphenoxy)phenyl]fluorene, 9,9-bis[4-(4-amino-2-methylphenoxy)-3-methylphenyl]fluorene, 9,9-bis[4-(4-amino-2-ethylphenoxy)-3-methylphenyl]fluorene, 9,9-bis[4-(4-amino-2-n-propylphenoxy)-3-methylphenyl]fluorene, 9,9-bis[4-(4-amino-2-i-propylmethylphenoxy)-3-methylphenyl]fluorene, 9,9-bis[4-(4-amino-2-t-butylphenoxy)-3-methylphenyl]fluorene, 9,9-bis[4-(4-amino-2-trifluoromethylphenoxy)-3-methylphenyl]fluorene, 9,9-bis[4-(4-amino-2-methylphenoxy)-3-ethylphenyl]fluorene, 9,9-bis[4-(4-amino-2-ethylphenoxy)-3-ethylphenyl]fluorene, 9,9-bis[4-(4-amino-2-n-propylphenoxy)-3-ethylphenyl]fluorene, 9,9-bis[4-(4-amino-2-i-propylphenoxy)-3-ethylphenyl]fluorene, 9,9-bis[4-(4-amino-2-t-butylphenoxy)-3-ethylphenyl]fluorene, 9,9-bis[4-(4-amino-2-trifluoromethylphenoxy)-3-ethylphenyl]fluorene, 9,9-bis[4-(4-amino-2-methylphenoxy)-3-n-propylphenyl]fluorene, 9,9-bis[4-(4-amino-2-ethylphenoxy)-3-n-propylphenyl]fluorene, 9,9-bis[4-(4-amino-2-n-propylphenoxy)-3-n-propylphenyl]fluorene, 9,9-bis[4-(4-amino-2-i-propylphenoxy)-3-n-propylphenyl]fluorene, 9,9-bis[4-(4-amino-2-t-butylphenoxy)-3-n-propylphenyl]fluorene, 9,9-bis[4-(4-amino-2-trifluoromethylphenoxy)-3-n-propylphenyl]fluorene, 9,9-bis[4-(4-amino-2-methylphenoxy)-3-i-propylphenyl]fluorene, 9,9-bis[4-(4-amino-2-ethylphenoxy)-3-i-propylphenyl]fluorene, 9,9-bis[4-(4-amino-2-n-propylphenoxy)-3-i-propylphenyl]fluorene, 9,9-bis[4-(4-amino-2-i-propylphenoxy)-3-i-propylphenyl]fluorene, 9,9-bis[4-(4-amino-2-t- butylphenoxy)-3-i-propylphenyl]fluorene, 9,9-bis[4-(4-amino-2-trifluoromethylphenoxy)-3-i-propylphenyl]fluorene, 9,9-bis[4-(4-amino-2-methylphenoxy)-3-t-butylphenyl]fluorene, 9,9-bis[4-(4-amino-2-ethylphenoxy)-3-t-butylphenyl]fluorene, 9,9-bis[4-(4-amino-2-n-propylphenoxy)-3-t-butylphenyl]fluorene, 9,9-bis[4-(4-amino-2-i-propylphenoxy)-3-t-butylphenyl]fluorene, 9,9-bis[4-(4-amino-2-t-butylphenoxy)-3-t-butylphenyl]fluorene, 9,9-bis[4-(4-amino-2-trifluoromethylphenoxy)-3-t-butylphenyl]fluorene, 9,9-bis[4-(4-amino-2-methylphenoxy)-3-trifluoromethylphenyl]fluorene, 9,9-bis[4-(4-amino-2-ethylphenoxy)-3-trifluoromethylphenyl]fluorene, 9,9-bis[4-(4-amino-2-n-propylphenoxy)-3-trifluoromethylphenyl]fluorene, 9,9-bis[4-(4-amino-2-i-propylphenoxy)-3-trifluoromethylphenyl]fluorene, 9,9-bis[4-(4-amino-2-t-butylphenoxy)-3-trifluoromethylphenyl]fluorene, 9,9-bis[4-(4-amino-2-trifluoromethylphenoxy)-3-trifluoromethylphenyl]fluorene, 9,9-bis[4-(4-amino-2-methylphenoxy)-3,5-dimethylphenyl]fluorene, 9,9-bis[4-(4-amino-2-ethylphenoxy)-3,5-dimethylphenyl]fluorene, 9,9-bis[4-(4-amino-2-n-propylphenoxy)-3,5-dimethylphenyl]fluorene, 9,9-bis[4-(4-amino-2-i-propylphenoxy)-3,5-dimethylphenyl]fluorene, 9,9-bis[4-(4-amino-2-t-butylphenoxy)-3,5-dimethylphenyl]fluorene, 9,9-bis[4-(4-amino-2-trifluoromethylphenoxy)-3,5-dimethylphenyl]fluorene, 9,9-bis[4-(4-amino-2-methylphenoxy)-3,5-diethylphenyl]fluorene, 9,9-bis[4-(4-amino-2-ethylphenoxy)-3,5-diethylphenyl]fluorene, 9,9-bis[4-(4-amino-2-n-propylphenoxy)-3,5-diethylphenyl]fluorene, 9,9-bis[4-(4-amino-2-i-propylphenoxy)-3,5-diethylphenyl]fluorene, 9,9-bis[4-(4-amino-2-t-butylphenoxy)-3,5-dimethylphenyl]fluorene, 9,9-bis[4-(4-amino-2-trifluoromethylphenoxy)-3,5-diethylphenyl]fluorene, 9,9-bis[4-(4-amino-2-methylphenoxy)-3,5-di-n-propylphenyl]fluorene, 9,9-bis[4-(4-amino-2-ethylphenoxy)-3,5-di-n-propylphenyl]fluorene, 9,9-bis[4-(4-amino-2-n-propylphenoxy)-3,5-di-n-propylphenyl]fluorene, 9,9-bis[4-(4-amino-2-i-propylphenoxy)-3,5-di-n-propylphenyl]fluorene, 9,9-bis[4-(4-amino-2-t-butylphenoxy)-3,5-di-n-propylphenyl]fluorene, 9,9-bis[4-(4-amino-2-trifluoromethylphenoxy)-3,5-di-n-propylphenyl]fluorene, 9,9-bis[4-(4-amino-2-methylphenoxy)-3,5-di-1-propylphenyl]fluorene, 9,9-bis[4-(4-amino-2-ethylphenoxy)-3,5-di-1-propylphenyl]fluorene, 9,9-bis[4-(4-amino-2-n-propylphenoxy)-3,5-di-1-propylphenyl]fluorene, 9,9-bis[4-(4-amino-2-i-propylphenoxy)-3,5-di-1-propylphenyl]fluorene, 9,9-bis[4-(4-amino-2-t-butylphenoxy)-3,5-di-1-propylphenyl]fluorene, 9,9-bis[4-(4-amino-2-trifluoromethylphenoxy)-3,5-di-1-propylphenyl]fluorene, 9,9-bis[4-(4-amino-2-methylphenoxy)-3,5-di-t-butylphenyl]fluorene, 9,9-bis[4-(4-amino-2-ethylphenoxy)-3,5-di-t-butylphenyl]fluorene, 9,9-bis[4-(4-amino-2-n-propylphenoxy)-3,5-di-t-butylphenyl]fluorene, 9,9-bis[4-(4-amino-2-i-propylphenoxy)-3,5-di-t-propylphenyl]fluorene, 9,9-bis[4-(4-amino-2-t-butylphenoxy)-3,5-di-t-butylphenyl]fluorene, 9,9-bis[4-(4-amino-2-trifluoromethylphenoxy)-3,5-di-t-butylphenyl]fluorene, 9,9-bis[4-(4-amino-2-methylphenoxy)-3,5-di(trifluoromethyl)phenyl]fluorene, 9,9-bis[4-(4-amino-2-ethylphenoxy)-3,5-di(trifluoromethyl)phenyl]fluorene, 9,9-bis[4-(4-amino-2-n-propylphenoxy)-3,5-di(trifluoromethyl)phenyl]fluorene, 9,9-bis[4-(4-amino-2-i-propylphenoxy)-3,5-di(trifluoromethyl)phenyl]fluorene, 9,9-bis[4-(4-amino-2-t-butylphenoxy)-3,5-di(trifluoromethyl)phenyl]fluorene, 9,9-bis[4-(4-amino-2-trifluoromethylphenoxy)-3,5-di(trifluoromethyl)phenyl]fluorene, 9,9-bis[4-(2-amino-3-methylphenoxy)-3-methylphenyl]fluorene, 9,9-bis[4-(2-amino-4-methylphenoxy)-3-methylphenyl]fluorene, 9,9-bis[4-(2-amino-5-methylphenoxy)-3-methylphenyl]fluorene, 9,9-bis[4-(2-amino-6-methylphenoxy)-3-methylphenyl]fluorene, 9,9-bis[4-(2-amino-3-trifluoromethylphenoxy)-3-methylphenyl]fluorene, 9,9-bis[4-(2-amino-4-trifluoromethylphenoxy)-3-methylphenyl]fluorene, 9,9-bis[4-(2-amino-5-trifluoromethylphenoxy)-3-methylphenyl]fluorene, 9,9-bis[4-(2-amino-6-trifluoromethylphenoxy)-3-methylphenyl]fluorene, 9,9-bis[4-(3-amino-2-methylphenoxy)-3-methylphenyl]fluorene, 9,9-bis[4-(3-amino-4-methylphenoxy)-3-methylphenyl]fluorene, 9,9-bis[4-(3-amino-5-methylphenoxy)-3-methylphenyl]fluorene, 9,9-bis[4-(3-amino-6-methylphenoxy)-3-methylphenyl]fluorene, 9,9-bis[4-(3-amino-2-ethylphenoxy)-3-methylphenyl]fluorene, 9,9-bis[4-(3-amino-4-ethylphenoxy)-3-methylphenyl]fluorene, 9,9-bis[4-(3-amino-5-ethylphenoxy)-3-methylphenyl]fluorene, 9,9-bis[4-(3-amino-6-ethylphenoxy)-3-methylphenyl]fluorene, 9,9-bis[4-(3-amino-2-n-propylphenoxy)-3-methylphenyl]fluorene, 9,9-bis[4-(3-amino-4-n-propylphenoxy)-3-methylphenyl]fluorene, 9,9-bis[4-(3-amino-5-n-propylphenoxy)-3-methylphenyl]fluorene, 9,9-bis[4-(3-amino-6-n-propylphenoxy)-3-methylphenyl]fluorene, 9,9-bis[4-(3-amino-2-i-propylphenoxy)-3-methylphenyl]fluorene, 9,9-bis[4-(3-amino-4-i-propylphenoxy)-3-methylphenyl]fluorene, 9,9-bis[4-(3-amino-5-i-propylphenoxy)-3-methylphenyl]fluorene, 9,9-bis[4-(3-amino-6-i-propylphenoxy)-3-methylphenyl]fluorene, 9,9-bis[4-(3-amino-2-t-butylphenoxy)-3-methylphenyl]fluorene, 9,9-bis[4-(3-amino-4-t-butylphenoxy)-3-methylphenyl]fluorene, 9,9-bis[4-(3-amino-5-t-butylphenoxy)-3-methylphenyl]fluorene, 9,9-bis[4-(3-amino-6-t-butylphenoxy)-3-methylphenyl]fluorene, 9,9-bis[4-(3-amino-2-trifluoromethylphenoxy)-3-methylphenyl]fluorene, 9,9-bis[4-(3-amino-4-trifluoromethylphenoxy)-3-methylphenyl]fluorene, 9,9-bis[4-(3-amino-5-trifluoromethylphenoxy)-3-methylphenyl]fluorene, 9,9-bis[4-(3-amino-6-trifluoromethylphenoxy)-3-methylphenyl]fluorene, 9,9-bis[4-(4-aminophenoxy)-3-methylphenyl]fluorene, 9,9-bis[4-(4-aminophenoxy)-3-ethylphenyl]fluorene, 9,9-bis[4-(4-aminophenoxy)-3-n-propylphenyl]fluorene, 9,9-bis[4-(4-aminophenoxy)-3-i-propylphenyl]fluorene, 9,9-bis[4-(4-aminophenoxy)-3-t-butylphenyl]fluorene, 9,9-bis[4-(4-aminophenoxy)-3-trifluoromethylphenyl]fluorene, 9-bis[4-(4-aminophenoxy)-3,5-dimethylphenyl]fluorene, 9,9-bis[4-(4-aminophenoxy)-3,5-diethylphenyl]fluorene, 9,9-bis[4-(4-aminophenoxy)-3,5-di-n-propylphenyl]fluorene, 9,9-bis[4-(4-aminophenoxy)-3,5-di-1-propylphenyl]fluorene, 9,9-bis[4-(4-aminophenoxy)-3,5-di-t-butylphenyl]fluorene, 9,9-bis[4-(4-aminophenoxy)-3,5-di(trifluoromethyl)phenyl]fluorene, m-phenylenediamine, p-phenylenediamine, 2,2'-diaminobiphenyl, 2,3'-diaminobiphenyl, 2,4'-diaminobiphenyl, 3,3'-diaminobiphenyl, 3,4'-diaminobiphenyl, 4,4'-diaminobiphenyl, 2-(3-aminophenyl)-3'-aminobiphenyl, 2,2'-bis(3-aminophenyl)biphenyl, 2,2'-diaminobiphenylether, 2,3'-diaminobiphenylether, 2,4'-diaminobiphenylether, 3,3'-diaminobiphenylether, 3,4'-diaminobiphenylether, 4,4'-diaminobiphenylether, 2,2-bis(2-aminophenyl)propane, 2,2-bis(3-aminophenyl)propane, 2,2-bis(4-aminophenyl)propane, 2,2-bis[3-(2-aminophenoxy)phenyl]propane, 2,2-bis[3-(3-aminophenoxy)phenyl]propane, 2,2-bis[4-(2-aminophenoxy)phenyl]propane, 2,2-bis[4-(3-aminophenoxy)phenyl]propane, and 2,2-bis[4-(4-aminophenoxy)phenyl]propane. In the present invention, examples of diamines used in the present invention further include aliphatic diamines such as 4,4'-methylenebis(cyclohexylamine), isophoronediamine, cis-1,4-diaminocyclohexane, 1,4-cyclohexanebis(methylamine), 2,5-bis(aminomethyl)bicyclo[2.2.1]heptane, 2,6-bis(aminomethyl)bicyclo[2.2.1]heptane, 3,8-bis(aminomethyl)tricyclo[5.2.1.0]decane, 1,3-diaminoadamantane, 2,2-bis(4-aminocyclohexyl)propane, 2,2-bis(4-aminocyclohexyl)hexafluoropropane, 1,3-propanediamine, 1,4-tetramethylenediamine, 1,5-pentamethylenediamine, 1,6-hexamethylenediamine, 1,7-heptamethylenediamine, 1,8-octamethylenediamine, 1,9-nonamethylenediamine, bis(4-aminocyclohexyl)methane, and bis(4-amino-3-methylcyclohexyl)methane.

In the present invention, together with the above described triamine and so on, a siloxane diamine or an amine compound having four or more amino groups in a molecule thereof may be used in a state in which it is copolymerized with a triamine and so on. Alternatively, together with the above described triamine and so on, a siloxane diamine or an amine compound having four or more amino groups in a molecule thereof. may be used by being added with the triamine and so on in the synthesis of the hyperbranched polyamic acid. Examples of siloxane diamines include (3-aminopropyl)tetramethyldisiloxane, bis(aminophenoxy)dimethylsilane, and bis(3-aminopropyl)polymethyldisiloxane. Examples of amine compounds having four or more amino groups in a molecule thereof include tris(3,5-diaminophenyl)benzene and tris(3,5-diaminophenoxy)benzene.

In addition, derivatives of the above-listed aromatic tetracarboxylic dianhydride, triamine, diamine and aromatic compound having four or more amino groups in a molecule, which have a substituent such as a hydrocarbon group (e.g., an alkyl group, a phenyl group, a cyclohexyl group), a hydroxyl group, a halogen group, an alkoxy group, an acetyl group and a sulfonic group on a benzene ring thereof, may also be used in the present invention.

It is preferable that the reaction of the tetracarboxylic dianhydride with the triamine (and diamine, siloxane diamine, or amine compound having four or more amino groups in a molecule thereof, hereinafter, may be collectively referred to as amine component) is conducted at a relatively low temperature, concretely, at a temperature of 100° C. or less, preferably, at a temperature of 50° C. or less. Further, in the reaction of the tetracarboxylic dianhydride with the amine component, it is preferable that the total number of anhydrides derived from the tetracarboxylic dianhydride: $\alpha$ and a total number of amine groups derived from the amine component: $\beta$ satisfy $\alpha:\beta=1.0:0.3$ to $1.0:1.5$, preferably, $\alpha:\beta=1.0:0.3$ to $1.0:0.5$, or $\alpha:\beta=1.0:1.0$ to $1.0:1.5$.

Further, it is preferable that the synthesis of the polyamic acid is conducted in a predetermined solvent. Examples of solvents usable in the present invention include polar aprotic solvents such as N-methyl-2-pyrrolidone, N,N-dimethylacetamide, N,N-diethylacetamide, dimethyl formamide, dimethyl sulfoxide, diethyl sulfoxide, tetramethyl sulfone, hexamethyl sulfone, and hexamethyl phosphamide; phenolic solvents such as m-cresol, o-cresol, p-cresol, p-chlorophenol, m-chlorophenol, and o-chlorophenol; and ether solvents such as dioxane, tetrahydrofuran, diglyme, and bis(2-methoxyethyl)ether; and other solvents such as N-methylcaprolactam, 1,2-dimethoxyethane, 1,2-bis(2-methoxyethoxy)ethane, γ-butyrolactone, ethyl lactate, 3-methoxypropionic acidmethyl, propylene glycol monomethyl ether acetate, cyclohexanone, tetrahydrofuran, 1,3-dioxane, 1,4-dioxane, pyridine, picoline, dimethylsulfone, and tetramethylurea. Any one of, or any combination of these solvents may be used.

Then, thus resulting polyamic acid and a silane coupling agent having an alkoxysilyl group are reacted. By employing a polyamic acid resulting from the reaction, which has a hydroxyl group and/or an alkoxysilyl group in at least a part of a plurality of end groups thereof, silica particles which will be described later are allowed to be compounded in a larger amount. Accordingly, the porous polyimide finally obtained exhibits more excellent low dielectric constant without deterioration of mechanical strength Examples of silane coupling agents having an alkoxysilyl group used in the present invention include 3-aminopropyltrimethoxysilane, 3-aminopropyltriethoxysilane, aminophenyltrimethoxysilane, 3-aminopropylmethyldiethoxysilane, 3-aminophenyldimethylmethoxysilane, aminophenyltrimethoxysilane, (aminoethylaminomethyl)phenethyltrimethoxysilane, propyltrimethoxysilylcarboxylic acid, propylmethyldiethoxysilylcarboxylic acid, dimethylmethoxysilylbenzoic acid, 3-aminopropylmethyldimethoxysilane, 3-aminopropyldimethylethoxysilane, 2-aminoethylaminomethyltrimethoxysilane, N-phenyl-3-aminopropylmethyldimethoxysilane, carboxylic anhydride group-containing silanes (3-triethoxysilylpropylsuccinicanhydride, anhydride of 3,4-dicarboxyphenyltrimethoxysilane, anhydride of 3,4-dicarboxybenziltrimethoxysilane), mercaptomethyltrimethoxysilane, 2-mercaptoethyltrimethoxysilane, 3-mercaptopropyltrimethoxysilane, 3-mercaptopropyldimethoxymethylsilane, (2-aminoethylamino)methyltrimethoxysilane, 3-(2-aminoethylamino)propyltrimethoxysilane, 3-(2-aminoethylamino)propyldimethoxymethylsilane, 3-[2-(2-aminoethylamino)ethylamino]propyltrimethoxysilane, N-(3-trimethoxysilylpropyl)urea, N-(3-triethoxysilylpropyl)urea, 2-(2-aminoethylthio)ethyltrimethoxysilane, 2-(2-aminoethylthio)ethyltriethoxysilane, 2-(2-aminoethylthio)ethyldimethoxymethylsilane, 2-(2-aminoethylthio)ethyldiethoxymethylsilane, 2-aminophenyltrimethoxysilane, 2-aminophenyltriethoxysilane, 3-aminophenyltrimethoxysilane, 3-aminophenyltriethoxysilane, 4-aminophenyltrimethoxysilane, 4-aminophenyltriethoxysilane, bis(3-trimethoxysilylpropyl)amine, bis(3-triethoxysilylpropyl)amine, 3-cyclohexylaminopropyltrimethoxysilane, 3-cyclohexylaminopropyldimethoxymethylsilane, 3-phenylaminopropyltrimethoxysilane, 3-phenylaminopropyldimethoxymethylsilane, 3-benzylaminopropyltrimethoxysilane, 3-benzylaminopropyldimethoxymethylsilane, 3-(p-vinylbenzylamino)propyltrimethoxysilane, 3-(p-vinylbenzylamino)propyldimethoxymethylsilane, 3-allylaminopropyltrimethoxysilane, 3-allylaminopropyldimethoxymethylsilane, 3-piperazinopropyltrimethoxysilane, 3-piperazinopropyldimethoxymethylsilane, 2-(3,4-epoxycyclohexyl)ethyltrimethoxymethylsilane, 2-(3,4-epoxycyclohexyl)ethyldimethoxymethylsilane, 3-isocyanatepropyltrimethoxysilane, 3-isocyanatepropyltriethoxysilane, 3-isocyanatepropyldimethoxymethylsilane, 3-isocyanatepropyldiethoxymethylsilane, 3-glycidoxypropylpropyltrimethoxysilane, 3-glycidoxypropyltriethoxysilane, 3-glycidoxypropylmethyldimethoxysilane, and 3-glycidoxypropylmethyldiethoxysilane.

In the present invention, instead of the silane coupling agent having the above-described alkoxysilyl group, a multifunctional compound which has a functional group capable of reacting with an amino group, an anhydride group or a carboxylic group and a functional group capable of reacting with a silanol group in a molecule thereof may be used. Examples of multifunctional compounds include 2-aminoethanol, 3-amino-1-propanol, 1-amino-2-butanol, 1-amino-1-butanol, 3-aminopropionic acid, 2-aminopropionic acid, diisocyanate compounds, and diglycidyl compounds.

The reaction of the silane coupling agent with the hyperbranched polyamic acid is preferably conducted at the same temperature condition and in the same solvent as the above-described reaction of the tetracarboxylic dianhydride with the triamine.

The thus resulting polyamic acid having a hydroxyl group and/or an alkoxysilyl group in at least a part of a plurality of end groups thereof is reacted with silica particles to obtain the organic-inorganic polymer hybrid in which the polyamic acid and the silica particles equivalent to the silica phase are held together by covalent bond.

As the above silica particles, any known silica particles may be used. The size (average particle diameter) of the silica particles is generally 10 pm or less, preferably 100 nm or less, more preferably 50 nm or less, and still more preferably 5 to 30 nm. Further, organosol of the silica particles is advantageously employed. The amount of the silica particles is appropriately determined depending on porosity of the intended porous polyimide material. In the organic-inorganic polymer hybrid obtained according to the above mentioned method, if triamine alone is used and no diamine is used, excellent transparency can be exhibited even when silica particles are used such that the amount of silica in the hybrid is in a concentration of about 70% by weight.

The above-described reaction of the polyamic acid with the silica particles easily proceeds in a predetermined solvent. As such solvent, it is preferable to use one exemplified as a solvent for the synthesis of hyperbranched polyimide acid. The organosol of the silica particles is added in the polyamic acid solution of the solvent and the solution is stirred, thereby obtaining the polyamic acid-silica hybrid in which the polyamic acid having hydroxyl group and/or an alkoxysilyl group in at least a part of a plurality of end groups thereof and the silica particles equivalent to the silica phase are held together by covalent bond.

Then, the resulting polyamic acid-silica hybrid is imidized to synthesize an organic-inorganic polymer hybrid.

Specifically, the polyamic acid-silica hybrid has a structure in which the silica particles are relatively uniformly present around polyamic acid molecules, because the silica particles are covalently bonded to a hydroxyl group and/or an alkoxysilyl group of a plurality of end groups of the polyamic acid. Then, by imidization of such a polyamic acid-silica hybrid, an organic-inorganic polymer hybrid in which the silica particles kept uniformly is obtained.

When the polyamic acid is a hyperbranched polyamic acid, the number of end groups increases as the number of branches increases. By previously modifying the numerous end groups to a hydroxyl groups or an alkoxysilyl groups effectively with a silane coupling agent having an alkoxysilyl group, a larger number of silica particles can be covalently bonded with the polyamic acid. By imidization of the polyamic acid-silica hybrid in which a lot of silica phases are covalently bonded to the polyamic acid, an organic (polyimide phase)-inorganic (silica phase) polymer hybrid including a lot of silica phases can be obtained. Thus, the intended porous polyimide obtained by removing the silica phases from the hybrid includes numerous fine pores. Accordingly, the porous polyimide exhibits more excellent low dielectric constant and has sufficient mechanical strength.

The method of imidization of the polyamic acid-silica hybrid is appropriately selected from the conventional methods depending on the form, use of the intended porous polyimide material. For example, when porous polyimide material is produced in a form of thin film in order to be used as a film, the porous polyimide material can be produced according to the following methods like common high polymer materials. Specifically, examples of the methods include: 1) a method including the steps of: casting a mixed solution including a hyperbranched polyamic acid and silica particles which are added in a predetermined solvent onto a substrate such as glass or polymer film, and imidizing (heating and drying) it; and 2) a method including the steps of: casting a mixed solution onto a substrate such as glass or polymer film; immersing the solution in a receiving solvent such as water, alcohol, or hexane, for film formation, and imidizing (heating and drying) it. Any one of the above methods may be employed in the present invention. Further, the polyamic acid-silica hybrid may be imidized by a chemical treatment.

Hereinbefore, an example of the synthesis method of an organic-inorganic polymer hybrid using silica particles is described in detail. It is to be understood that the present invention is not limited to the synthesis method described above. For example, a porous polyimide of the present invention can be synthesized by the steps of: reacting a tetracarboxylic dianhydride with a diamine and/or a triamine in the presence of silica particles; reacting the reaction solution by adding a predetermined silane coupling agent; and imidizing the resulting polyamic acid-silica hybrid.

b) Synthesis Method of an Organic-Inorganic Polymer Hybrid Via Sol-Gel Method

In this method also, a polyamic acid is synthesized at first. Examples of tetracarboxylic dianhydrides and diamines to be used for the synthesis of the polyamic acid are the same as in above method a): Synthesis method of an organic-inorganic polymer hybrid using silica particles. In addition, examples of diamines and triamines to be used are the same as in above method a). Further, a siloxane diamine and an amine compound having four or more amino groups in a molecule thereof may be used together like in above method a). Furthermore, the conditions of synthesis are the same as in above method a).

Subsequently, the resulting polyamic acid is reacted with a silane coupling agent having an alkoxysilyl group.

Examples of silane coupling agents having an alkoxysilyl group include the above silane coupling agents that can be used in the synthesis of the organic-inorganic polymer hybrid according to the method a). Specifically, the examples include 3-aminopropyltrimethoxysilane, 3-aminopropyltriethoxysilane, aminophenyltrimethoxysilane, 3-aminopropylmethyldiethoxysilane, 3-aminophenyldimethylmethoxysilane, aminophenyltrimethoxysilane, and (aminoethylaminomethyl)phenethyltrimethoxysilane.

Further, it is preferable that the reaction of such silane coupling agent with the polyamic acid is conducted in the same temperature condition and in the same solvent as the reaction of the tetracarboxylic dianhydride with the amine component.

Next, the organic-inorganic polymer hybrid having a molecular structure in which the polyimide phase and the silica phase are held together by covalent bond is synthesized by using the resulting hyperbranched polyamic acid having a hydroxyl group and/or an alkoxysilyl group in at least a part of a plurality of end groups thereof. The synthesis is advantageously conducted according to the following method.

The first method including the steps of polycondensation and imidization of a polyamic acid by itself in which at least a part of a plurality of end groups thereof is a hydroxyl group and/or an alkoxysilyl group.

Specifically, the silica phase (inorganic polymer phase constituted of $SiO_2$ units) is yielded by polycondensation via sol-gel reaction between the polyamic acid molecules (dehydrative condensation reaction of a silanol group which is formed by hydrolysis of the alkoxysilyl group). By proceeding this polycondensation concurrently with imidization of the polyamic acid, the organic-inorganic polymer hybrid having a molecular structure in which the polyimide phase and the silica phase are held together by covalent bond is synthesized. Although water is required in the polycondensation via sol-gel reaction between the polyamic acid molecules, the sol-gel reaction effectively proceeds by the water yielded in the imidization between the polyamic acid molecules.

The second method including the steps of: sol-gel reaction of a polyamic acid having a hydroxyl group and/or an alkoxysilyl group in at least a part of a plurality of end groups thereof with an alkoxysilane compound in the presence of water; and imidization of the resulting reaction product.

Namely, when a polyamic acid and an alkoxysilane compound are present within the same system in the presence of water, the polyamic acid and the alkoxysilane compound are polycondensated via sol-gel reaction, thereby forming a polyamic acid having a silica phase (inorganic polymer phase constituted of $SiO_2$ units). Then, the polyamic acid having the silica phase is subjected to a heat treatment or a chemical treatment to imidize reactive end groups (amino group, acid anhydride group) which is present in the polyamic acid molecules. Accordingly, the organic-inorganic polymer hybrid having a molecular structure in which the polyimide phase and the silica phase are held together by covalent bond is obtained.

The third method including the steps of: imidization of a polyamic acid having a hydroxyl group and/or an alkoxysilyl group in at least a part of a plurality of end groups thereof to obtain a polyimide; and sol-gel reaction of the resulting polyimide with an alkoxysilane compound in the presence of water.

Specifically, the polyamic acid is subjected to a heat treatment or a chemical treatment at first to imidize reactive end groups (amino group, acid anhydride group) which is present in the polyamic acid molecules, thereby forming a polyamic acid having an alkoxysilyl group. When the resulting polyimide and the alkoxysilane compound are present within the same system in the presence of water, the polyimide and the alkoxysilane compound are polycondensated via sol-gel reaction. Consequently, the organic-inorganic polymer hybrid comprising the polyimide phase and the silica phase (inorganic polymer phase constituted of $SiO_2$ units) is obtained.

In the above-described second method, the polycondensation (sol-gel reaction) of a polyamic acid and an alkoxysilane compound and the imidization of the polyamic acid may be carried out successively. Specifically, the method may comprise the steps of: adding an alkoxysilane compound in a solution of a polyamic acid; stirring the solution for a predetermined time with keeping the temperature at a relatively low degree, so that the polyamic acid and the alkoxysilane compound are subjected to polycondensation; and heating the solution to imidize the polyamic acid (which was subjected to the polycondensation with the alkoxysilane compound) in the solution.

As the alkoxysilane compounds, one represented by the following formula can be used. Specifically, examples of alkoxysilane compounds include tetramethoxysilane (TMOS), tetraethoxysilane (TEOS), tetrapropoxysilane, tetraisopropoxysilane, tetrabutoxysilane, trimethoxysilane, triethoxysilane, methyltrimethoxysilane, methyltriethoxysilane, methyltripropoxysilane, methyltributoxysilane, ethyltrimethoxysilane, ethyltriethoxysilane, n-propyltrimethoxysilane, n-propyltriethoxysilane, isopropyltrimethoxysilane, isopropyltriethoxysilane, phenyltrimethoxysilane, phenyltriethoxysilane, dimethylmethoxysilane, dimethylethoxysilane, diphenyldimethoxysilane, diphenyldiethylsilane, trifluoromethyltriethoxysilane, trifluoromethyltrimethoxysilane, vinyltrimethoxysilane, vinyltriethoxysilane, 3-glycidoxypropyltrimethoxysilane, 3-glycidoxypropyltriethoxysilane, and compounds such as alkyl substitution products of the above listed compounds. Any one or, any combination of these compounds may be appropriately selected and used.

formula (1)

where
R$^1$ and R$^2$ represent hydrocarbon groups,
m is 0 or an integer, and
n is an integer, in which m+n=4.

In the above-described second method and the third method, as the additive amount of alkoxysilane compound increases or decreases, the amount of silica contained in the organic-inorganic polymer hybrid increases or decreases, which ultimately affects the porosity of the porous polyimide finally obtained. Generally, it is preferable that the amount of silica in the organic-inorganic polymer hybrid is in a range of 0.05 to 95% by weight, preferably, in a range of 0.1 to 50% by weight.

Then, a removal treatment of the silica phase is performed on the resulting organic-inorganic polymer hybrid having a molecular structure in which the polyimide phase and the silica phase are held together by covalent bond, thereby obtaining the intended porous polyimide.

In the present invention, any conventional methods may be employed for removing the silica phase from the organic-inorganic polymer hybrid. Generally, the method in which the organic-inorganic polymer hybrid is immersed in a solution of a fluorine-containing compound such as a hydrofluoric acid and an ammonium hydrogen fluoride for a predetermined time is employed to remove the silica phase. Incidentally, when the solution containing fluorine-containing compound such as a hydrofluoric acid is used, it is common to use one having a concentration within a range of 0.5 to 40% by weight.

Even if the resulting porous polyimide has a high porosity, electric properties (low dielectric constants) thereof are excellent without deteriorating transparency and mechanical strength which are inherent in polyimide. The porous polyimide of the present invention having such excellent properties is advantageously used as semiconductor electric materials, coating materials, painting materials, separation membranes and fuel-cell electrolyte membranes, for example. In addition, the porous polyimide is expected to use as separation membranes, heat shrinkable tubes, and partially porous films, for example. Further, there is a possibility that functional groups are supported in the pores.

EXAMPLES

Some Examples of the present invention will be described to clarify the present invention more concretely. It is to be understood that the invention is not limited to the details of illustrated examples and the foregoing description, but may be embodied with various changes, modifications and improvement, which may occur to those skilled in the art without departing from the scope of the invention defined in the attached claims.

Properties of the resulting films in each of the following Examples was investigated and calculated according to the following methods.

—Porosity—

Porosity was calculated by changes of weight and volume of the resulting film between before and after the immersion into HF solution.

—A thermal decomposition temperature (a 5% weight loss temperature: $T_d^5$)—

A thermogravimetric analysis (TG-DTA) for the resulting film was carried out in an air atmosphere at a heating rate of 10° C./min. A thermal decomposition temperature (a 5% weight loss temperature: $T_d^5$ [° C.]) was determined by the obtained TG curve.

—Coefficient of Linear Thermal Expansion (CTE)—

A thermo mechanical analysis (TMA) for the resulting films was carried out in a nitrogen stream at a heating rate of 5° C./min. Coefficient of linear thermal expansion (CTE [ppm/° C.]) was determined by the obtained elongation degree between 100 and 150° C. of TMA curve.

—Light Transmittance—

Ultraviolet-visible transmittance measurement was carried out to determine a light transmittance [%] at 600 nm.

—Tensile Strength, Degree of Elongation and Young's Modulus—

A tensile strength test was conducted for the resulting film at room temperature at an elongation rate of 5 mm/min to determine degree of elongation ($\in$ [%]), tensile strength ($\sigma$ [MPa]) and Young's modulus (E [GPa]).

—Dielectric Constant—

Dielectric constant of the resulting film was determined under the condition of frequency range of 100 kHz and a measurement temperature of 25° C. In the measurement, the film that was subjected to an electrode treatment by applying silver paste on both faces thereof was used as a specimen.

Examples 1a to 1f

To a 100 mL three-necked flask equipped with a stirrer, a nitrogen inlet tube, a calcium chloride tube, and a thermometer was added 40 mL of N,N-dimethylacetamide (DMAc), and 1.3 g (3 mmol) of 4,4'-(hexafluoroisopropylidene)diphthalic dianhydride (6FDA) was dissolved therein. While this solution was stirring in a nitrogen stream, 0.64 g (1.6 mmol) of 1,3,5-tris(4-aminophenoxy)benzene (TAPOB) previously dissolved in 20 mL of DMAc was gradually added to the solution. Then, the solution was stirred at 25° C. for 3 hours. Thereafter, to this solution was added 0.07 g (0.4 mmol) of aminopropyltrimethoxysilane (APTrMOS), and the solution was stirred for 1 hour, thereby synthesizing a silane-terminated hyperbranched polyamic acid.

A predetermined amount of colloidal silica-dispersed DMAc was dropwise added to the DMAc solution of the obtained silane-terminated hyperbranched polyamic acid, and the solution was stirred vigorously. Then, the DMAc solution was cast onto a polyester film, and dried at 85° C. for 2 hours, thereby preparing a film formed of the hyperbranched polyamic acid and an organic-inorganic polymer hybrid of the colloidal silica. Six kinds of films with different silica contents (Example 1a: about 0% by weight, Example 1b: about 10% by weight, Example 1c: about 20% by weight, Example 1d: about 30% by weight, Example 1e: about 40% by weight, and Example 1f: about 50% by weight) were prepared by appropriately changing drop volume of Colloidal silica-dispersed DMAc.

The film was subjected to a heat treatment in a nitrogen atmosphere at 100° C. for 1 hour, at 200° C. for 1 hour, and further at 300° C. for 1 hour, thereby obtaining a film formed of the organic-inorganic polymer hybrid. The film was immersed into HF solution having a concentration of about 15% by weight to remove the silica phase. Then, the film was washed with ion-exchange water for 1 hour and subsequently vacuum dehydrated at 100° C. for 12 hours. Accordingly, intended six kinds of films were obtained.

Figure 1:
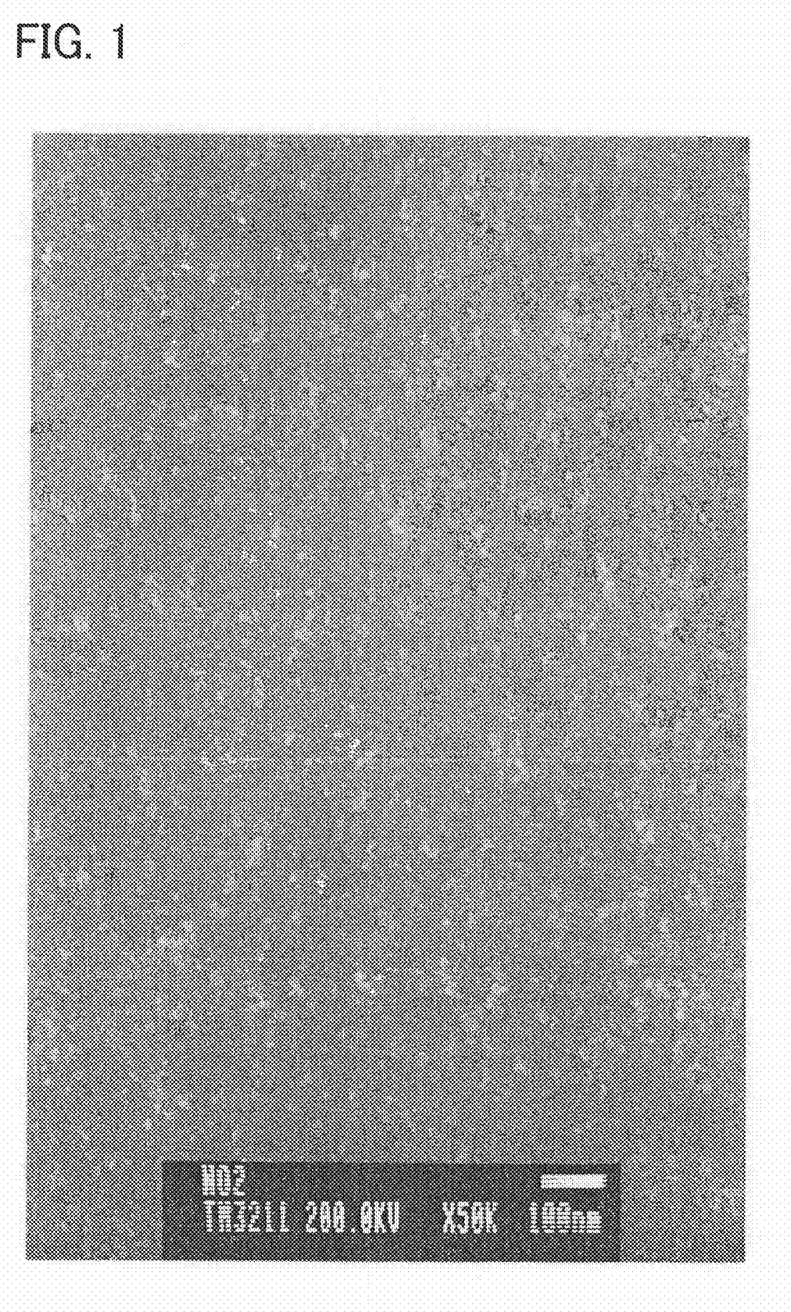
FIG. 1 is a TEM photograph of a porous polyimide film according to one example of the present invention.

Each of the resulting films was confirmed to be porous. In addition, each of the resulting films had excellent transparency, although the color thereof was yellowish. Physical properties of each of the films are shown in Table 1 below. Further, a TEM photograph of the film having porosity of 7% (Example 1b) is shown in FIG. 1.

In addition, infrared absorption spectrum (FT-IR) of each of six kinds of films (Examples 1a to 10 was measured. While an absorption at 1650 cm$^{-1}$, which is derived from carbonyl group of polyamic acid, was not recognized, absorptions at 1780 cm$^{-1}$, 1725 cm$^{-1}$, 1380 cm$^{-1}$ which are characteristic of carbonyl group of polyimide were recognized. Further, absorption peaks of around 1120 cm$^{-1}$ ($\nu$ Si—O—Si) and 470 cm$^{-1}$ ($\delta$ Si—O—Si), which are based on Si—O—Si bond and which were recognized before the HF solution treatment, were not recognized after HF solution treatment. As a result, the resulting films were each confirmed to be formed of a hyperbranched polyimide.

Examples 2a to 2f

Figure 2:
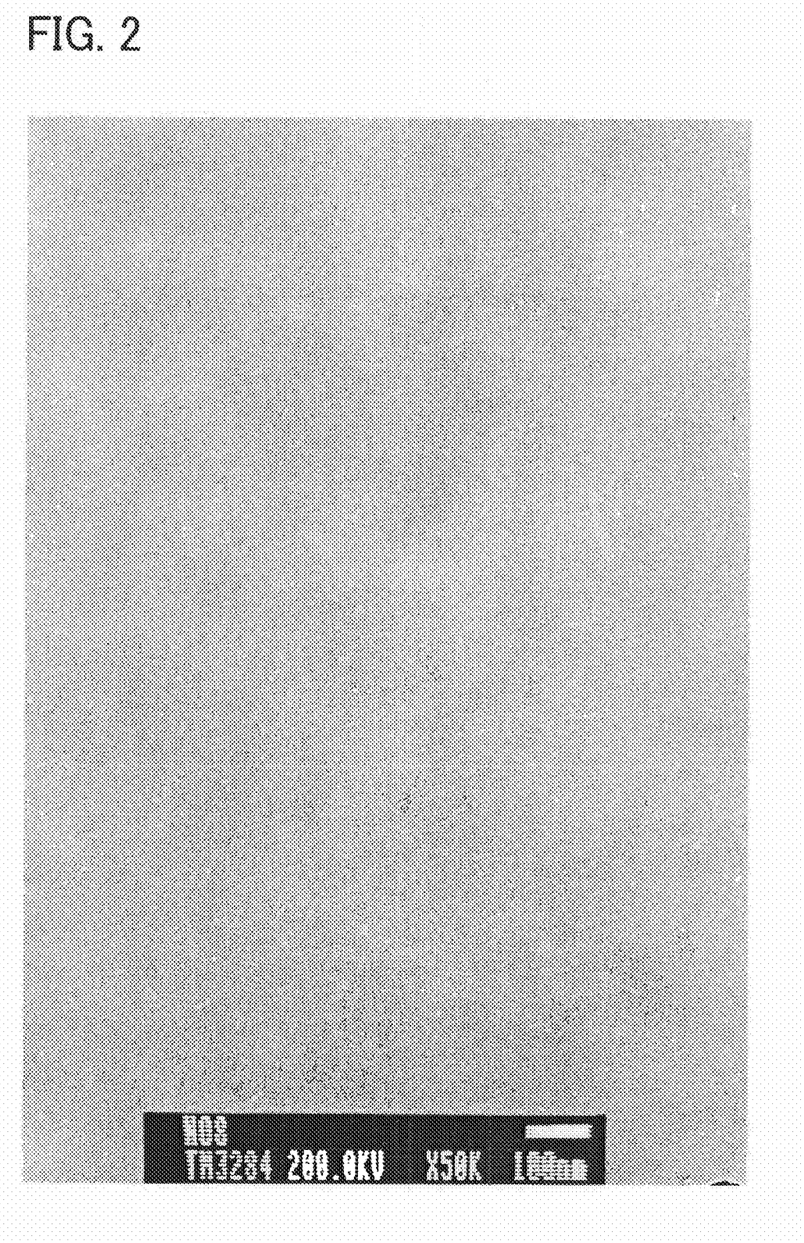
FIG. 2 is a TEM photograph of a porous polyimide film according to another example of the present invention.

Six kinds of films (Examples 2a to 2f) were obtained in the same manner as Example 1 with the exceptions that 0.65 g (3 mmol) of pyromellitic dianhydride (PMDA) was used as an aromatic tetracarboxylic dianhydride and the amount of Colloidal silica-dispersed DMAc was changed. By FT-IR measurement, each of the six films was also confirmed to be a hyperbranched polyimide film. The resulting films each formed of a porous hyperbranched polyimide had excellent transparency, although the color thereof was yellowish. Physical properties of each of the films are shown in Table 1 below. A TEM photograph of the film having porosity of 7% (Example 2b) is shown in FIG. 2.

Examples 3a to 3d

To a 100 mL three-necked flask equipped with a stirrer, a nitrogen inlet tube, a calcium chloride tube, and a thermometer was added 40 mL of N,N-dimethylacetamide (DMAc), and 1.3 g (3 mmol) of 4,4'-(hexafluoroisopropylidene)diphthalic dianhydride (6FDA) was dissolved therein. While this solution was stirring in a nitrogen stream, 0.64 g (1.6 mmol) of 1,3,5-tris(4-aminophenoxy)benzene (TAPOB) previously dissolved in 20 mL of DMAc was gradually added to the solution. Then, the solution was stirred at 25° C. for 3 hours. To this solution was added 0.07 g (0.4 mmol) of aminopropyltrimethoxysilane (APTrMOS), and the solution was stirred for 1 hour, thereby synthesizing a silane-terminated hyperbranched polyamic acid.

A predetermined amount of mixture of tetramethoxysilane (TMOS) and water ($H_2O$) (TMOS: $H_2O$=1:6 [molar ratio]) was added to the DMAc solution of the obtained silane-terminated hyperbranched polyamic acid, and the solution was stirred for 24 hours. Then, the solution was cast onto a polyester film. By changing the amount of tetramethoxysilane, four kinds of films were obtained. Each of the films was subjected to a heat treatment in a nitrogen atmosphere at 100° C. for 1 hour, at 200° C. for 1 hour, and further at 300° C. for 1 hour, thereby obtaining four kinds of films with different silica contents (Example 3a: about 0% by weight, Example 3b: about 10% by weight, Example 3c: about 20% by weight, and Example 3d: about 30% by weight).

Figure 3:
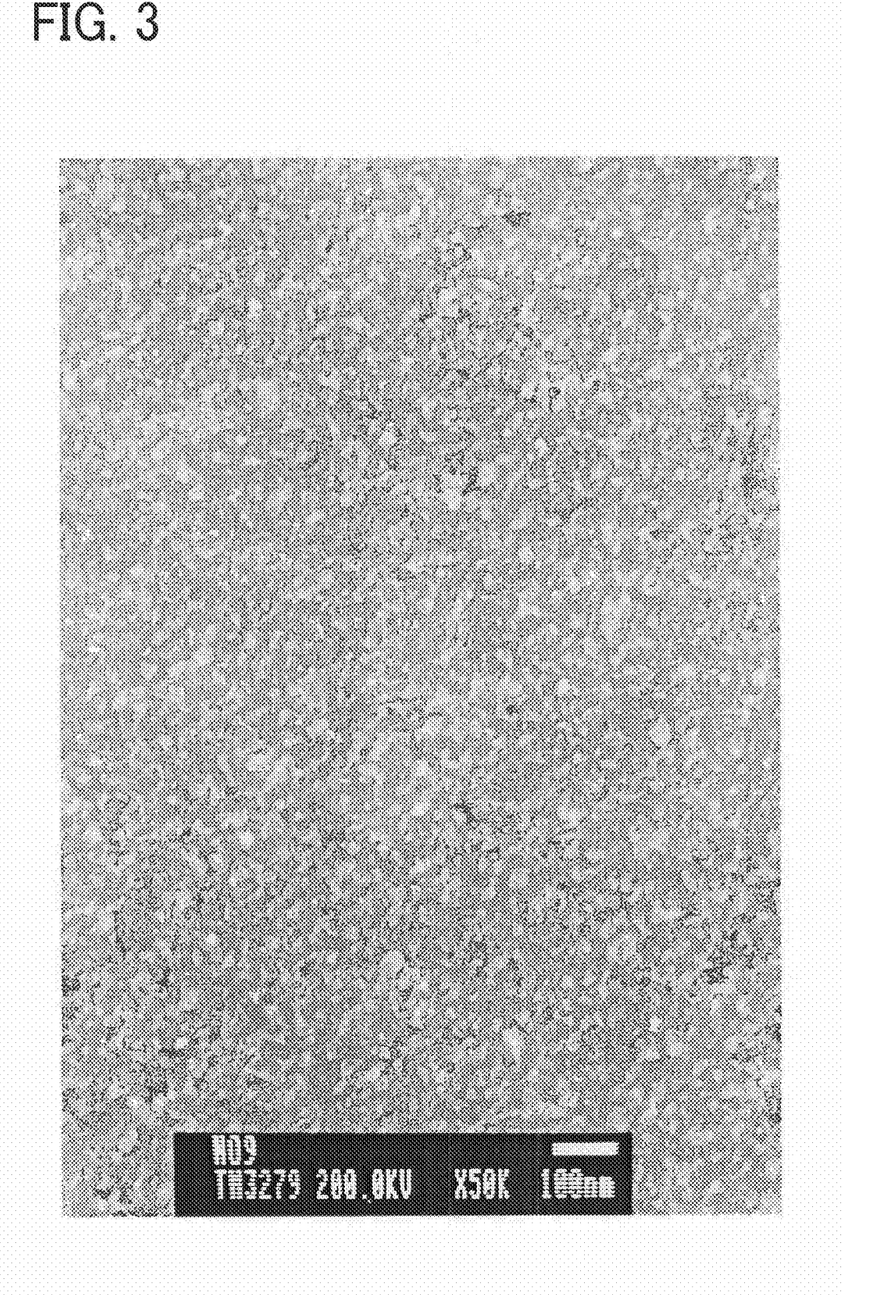
FIG. 3 is a TEM photograph of a porous polyimide film according to still another example of the present invention.

Each of the resulting films was immersed into HF solution having a concentration of about 15% by weight for 3 hours to remove the silica phase. Then, the film was washed with ion-exchange water for 1 hour and subsequently vacuum dehydrated at 100° C. for 12 hours. Accordingly, intended films (four kinds) were obtained. Physical properties of each of the films are shown in Table 1 below. A TEM photograph of the film having porosity of 21% (Example 3d) is shown in FIG. 3.

Each of the resulting films was confirmed to be porous. In addition, by FT-IR measurement, the resulting films were each confirmed to be formed of a hyperbranched polyimide. The resulting films each formed of a porous hyperbranched polyimide had excellent transparency, although the color thereof was yellowish.

TABLE 1

|   | Porosity [%] | $T_d^5$ [° C.] | CTE [ppm/° C.] | Light Transmittance [%] | E [GPa] | σ [MPa] | ε [%] | Dielectric constant |
|---|---|---|---|---|---|---|---|---|
| Example 1a | 0 | 457 | 54 | 89 | 2.8 | 96 | 4 | 2.8 |
| Example 1b | 7 | 457 | 58 | 88 | 2.3 | 73 | 4 | 2.5 |
| Example 1c | 14 | 452 | 45 | 88 | 2.1 | 68 | 4 | 2.4 |
| Example 1d | 21 | 446 | 44 | 87 | 1.7 | 49 | 3 | 2.3 |
| Example 1e | 30 | 432 | 46 | 89 | 1.3 | 33 | 3 | 2.1 |
| Example 1f | 39 | 427 | 75 | 89 | 1.1 | 28 | 3 | — |
| Example 2a | 0 | 464 | 35 | 85 | 2.9 | 89 | 5 | 3.5 |
| Example 2b | 7 | 458 | 43 | 83 | 2.4 | 84 | 8 | 3.3 |
| Example 2c | 14 | 451 | 40 | 85 | 2.2 | 86 | 7 | 3.2 |
| Example 2d | 21 | 450 | 28 | 87 | 2.1 | 67 | 5 | 2.9 |
| Example 2e | 30 | 449 | 48 | 87 | 1.9 | 59 | 6 | — |
| Example 2f | 39 | 438 | 54 | 86 | 1.8 | 62 | 6 | — |
| Example 3a | 0 | 457 | 54 | 89 | 2.8 | 96 | 4 | 2.8 |
| Example 3b | 7 | 447 | 49 | 88 | 2.6 | 91 | 5 | 2.4 |
| Example 3c | 14 | 431 | 44 | 89 | 2.3 | 79 | 5 | 2.3 |
| Example 3d | 21 | 425 | 42 | 90 | 1.8 | 61 | 5 | 2.3 |

Examples 4a to 4d

To a 100 mL three-necked flask equipped with a stirrer, a nitrogen inlet tube, a calcium chloride tube, and a thermometer was added 20 mL of N-methyl-2-pyrrolidone (NMP), and 2.2 g (7.5 mmol) of 1,3-bis(4-aminophenoxy)benzene (TPER) was dissolved therein. While this solution was stirring in a nitrogen stream, 3.2 g (7.3 mmol) of 4,4'-(hexafluoroisopropylidene)diphthalic dianhydride (6FDA) dissolved in 7 ml of NMP was gradually added to the solution. Then, the solution was stirred at 25° C. for 3 hours, thereby synthesizing an amine-terminated straight-chain polyamic acid.

To another 100 mL three-necked flask equipped with a stirrer, a nitrogen inlet tube, a calcium chloride tube, and a thermometer was added 7 mL of N-methyl-2-pyrrolidone (NMP), and 1.33 g (3.0 mmol) of 6FDA was dissolved therein. While this solution was stirring in a nitrogen stream, 0.45 g (1.1 mmol) of 1,3,5-tris(4-aminophenoxy)benzene (TAPOB) dissolved in 4 mL of NMP and 25.5 g of an amine-terminated straight-chain polyamic acid solution previously prepared were gradually added to the solution. Thereafter, the solution was stirred at 25° C. for 2 hours. Then, 0.36 g (2.3 mmol) of aminopropyltrimethoxysilane (APTrMOS) was added and the solution was stirred for 1 hour, thereby synthesizing a partially straight-chain silane-terminated hyperbranched polyamic acid.

A mixture of tetramethoxysilane (TMOS) and water ($H_2O$) (TMOS: $H_2O$=1:6 [molar ratio]) was added to NMP solution of the silane-terminated hyperbranched polyamic acid, and the solution was stirred for 24 hours. Then, the solution was cast onto a polyester film. The film was subjected to a heat treatment in a nitrogen atmosphere at 100° C. for 1 hour, at 200° C. for 1 hour, and further at 300° C. for 1 hour, thereby obtaining the film formed of the organic-inorganic polymer hybrid. By changing the amount of tetramethoxysilane, four kinds of films with different silica contents (Example 4a: about 0% by weight, Example 4b: about 10% by weight, Example 4c: about 20% by weight, and Example 4d: about 30% by weight) were prepared.

Each of the films was immersed into HF solution having a concentration of about 15% by weight for about 3 hours to remove the silica. Then, the film was washed with ion-exchange water for 1 hour and subsequently vacuum dehydrated at 100° C. for 12 hours. Accordingly, intended four kinds of films were obtained. Physical properties of each of the films are shown in Table 2 below.

Each of the resulting films was confirmed to be porous. In addition, by FT-IR measurement, the resulting films were each confirmed to be formed of a hyperbranched polyimide. The resulting films each formed of a porous hyperbranched polyimide had excellent transparency, although the color thereof was yellowish.

Examples 5a to 5d

First, an amine-terminated straight-chain hyperbranched polyamic acid was synthesized in the same manner as Examples 4a to 4d with the exception that 1.59 g (7.3 mmol) of pyromellitic dianhydride (PMDA) was used as an aromatic tetracarboxylic dianhydride.

Figure 4:
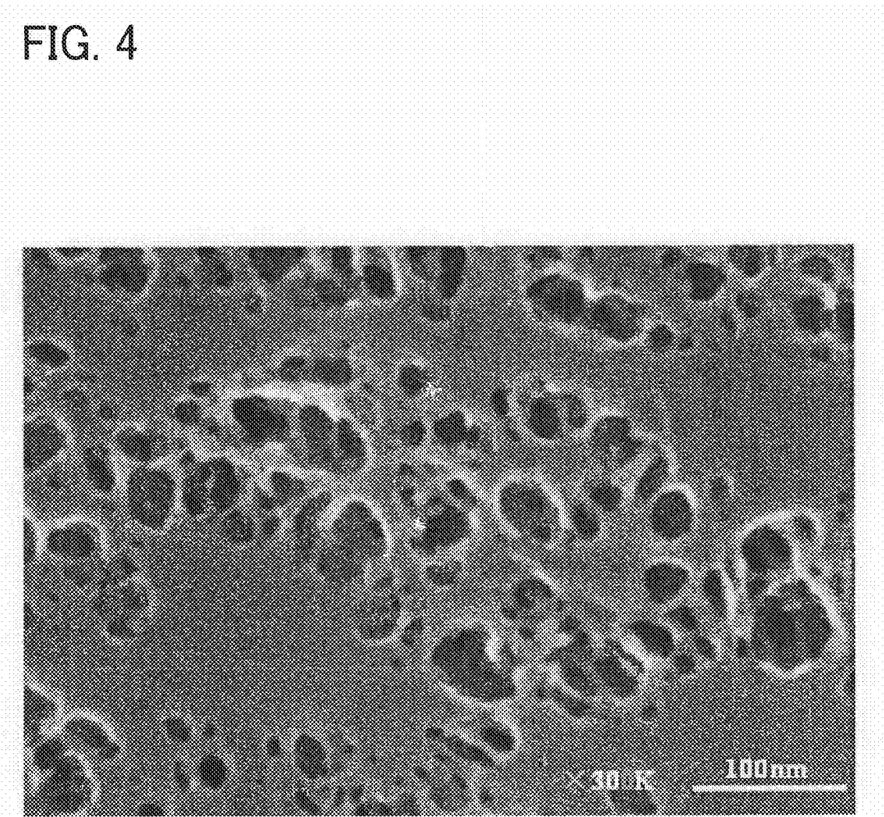
FIG. 4 is a STEM photograph of a porous polyimide film according to another example of the present invention.

Then, four kinds of films were obtained in the same manner as Examples 4a to 4c with the exceptions that 0.65 g (3 mmol) of pyromellitic dianhydride (PMDA) was used as an aromatic tetracarboxylic dianhydride and the above amine-terminated straight-chain hyperbranched polyamic acid was used. Each of the resulting films was confirmed to be porous. In addition, by FT-IR measurement, the resulting films were each confirmed to be formed of a hyperbranched polyimide. Of the obtained films, a STEM photograph of the film having porosity of 14% (Example 5c) is shown in FIG. 4. Physical properties of each of the films are shown in Table 2 below. The resulting films (Examples 5a to 5d) each formed of partially straight-chain porous hyperbranched polyamic acid had excellent transparency, although the color thereof was yellowish.

Examples 6a to 6g

To a 100 mL three-necked flask equipped with a stirrer, a nitrogen inlet tube, a calcium chloride tube, and a thermometer was added 20 mL of N-methyl-2-pyrrolidone (NMP), and 3.3 g (15.2 mmol) of pyromellitic dianhydride (PMDA) was dissolved therein. While this solution was stirring in a nitrogen stream, 2.9 g (14.7 mmol) of oxydianiline (ODA) dissolved in 10 mL of NMP was gradually added to the solution. Then, the solution was stirred at 25° C. for 3 hours, thereby synthesizing an anhydride-terminated straight-chain polyamic acid.

To another 100 mL three-necked flask equipped with a stirrer, a nitrogen inlet tube, a calcium chloride tube, and a thermometer were added 40 mL of N-methyl-2-pyrrolidone (NMP) and a predetermined amount of colloidal silica-dispersed DMAc, and 1.5 g (3.6 mmol) of 1,3,5-tris(4-aminophenoxy)benzene (TAPOB) was dissolved therein. While this solution was stirring in a nitrogen stream, 0.63 g (2.9 mmol) pyromellitic dianhydride (PMDA) dissolved in 40 mL of NMP was gradually added to the solution. Then, the solution was stirred at 25° C. for 2 hours, thereby obtaining an amine-terminated hyperbranched polyamic acid-silica hybrid solution.

The solution was stirred for 1 hour after 1.2 g (4.0 mmol) of a 3-ethoxysilylpropylsuccinic anhydride was added to the solution, thereby obtaining an organic-inorganic polymer hybrid solution.

Further, to this solution was gradually added 36.9 g of the previously prepared anhydride-terminated straight-chain polyamic acid, and the solution was stirred at 25° C. for 3 hours, thereby obtaining a partially straight-chain hyperbranched polyamic acid-silica hybrid. Then, this was cast onto a polyester film, and subjected to a heat treatment at 100° C. for 1 hour, 200° C. for 1 hour and 300° C. for 1 hour, thereby obtaining a film formed of a hyperbranched polyamic acid. Seven kinds of films with different silica contents (Example 6a: about 0% by weight, Example 6b: about 20% by weight, Example 6c: about 30% by weight, Example 6d: about 40% by weight, Example 6e: about 50% by weight, Example 6f: about 60% by weight, and Example 6g: about 70% by weight) were prepared according to the same method.

Each of the films was immersed into HF solution having a concentration of about 15% by weight for about 3 hours to remove silica. Then, the film was washed with ion-exchange water for 1 hour and subsequently vacuum dehydrated at 100° C. for 12 hours. Accordingly, the intended seven kinds of films were obtained.

Each of the resulting films was confirmed to be porous. In addition, by FT-IR measurement, the resulting films were each confirmed to be formed of a hyperbranched polyimide. Further, the resulting films each formed of porous hyperbranched polyimide had excellent transparency, although the color thereof was yellowish. Physical properties of each of the films are shown in Table 2 below.

TABLE 2

|  | Porosity [%] | $T_d^5$ [° C.] | CTE [ppm/° C.] | Light Transmittance [%] | E [GPa] | σ [MPa] | ε [%] |
|---|---|---|---|---|---|---|---|
| Example 4a | 0 | 476 | 57 | 89 | 2.3 | 113 | 11 |
| Example 4b | 7 | 467 | 60 | 88 | 1.9 | 110 | 11 |
| Example 4c | 14 | 468 | 64 | 87 | 1.7 | 91 | 10 |
| Example 4d | 21 | 456 | 59 | 87 | 1.6 | 85 | 10 |
| Example 5a | 0 | 478 | 50 | 87 | 2.5 | 103 | 9 |
| Example 5b | 7 | 469 | 57 | 85 | 2.1 | 84 | 10 |
| Example 5c | 14 | 464 | 60 | 83 | 1.9 | 74 | 11 |
| Example 5d | 21 | 457 | 59 | 82 | 1.8 | 77 | 19 |
| Example 6a | 0 | 471 | 51 | 76 | 2.5 | 106 | 10 |
| Example 6b | 14 | 465 | 59 | 72 | 2.1 | 68 | 8 |
| Example 6c | 21 | 473 | 60 | 84 | 2.0 | 66 | 16 |
| Example 6d | 30 | 471 | 67 | 77 | 1.9 | 60 | 15 |
| Example 6e | 39 | 462 | 65 | 80 | 1.9 | 67 | 19 |
| Example 6f | 49 | 459 | 83 | 81 | 1.6 | 68 | 29 |
| Example 6g | 60 | 454 | 58 | 78 | 1.6 | 68 | 22 |

Examples 7a to 7f

First, an anhydride-terminated straight-chain polyamic acid was synthesized in the same manner as Examples 5a to 5d with the exception that 6.7 g (15.2 mmol) of 4,4'-(hexafluoroisopropylidene)diphthalic dianhydride (6FDA) was used as an aromatic tetracarboxylic dianhydride.

Then, six kinds of films with different silica contents were obtained in the same manner as Examples 4a to 4d with the exceptions that 1.3 g (2.9 mmol) of 4,4'-(hexafluoroisopropylidene)diphthalic dianhydride (6FDA) was used as an aromatic tetracarboxylic dianhydride and the above anhydride-terminated straight-chain hyperbranched polyamic acid was used. Each of the resulting films was confirmed to be porous. The resulting films (Examples 7a to 7f) each formed of partially straight-chain porous hyperbranched polyamic acid had excellent transparency, although the color thereof was yellowish. Physical properties of each of the films are shown in Table 3 below.

Examples 8a to 8e

To a 100 mL three-necked flask equipped with a stirrer, a nitrogen inlet tube, a calcium chloride tube, and a thermometer was added 10 mL of N,N-dimethylacetamide (DMAc), and 0.65 g (3 mmol) of a pyromellitic dianhydride (PMDA) was dissolved therein. While this solution was stirring in a nitrogen stream, 0.8 g (2.75 mmol) of a 1,3-bis(4-aminophenoxy)benzene (TPER) and 10 mL of DMAc were added to the solution. Then, the solution was stirred at 25° C. for 3 hours, thereby synthesizing an anhydride-terminated straight-chain polyamic acid. To this solution was added 0.09 g (0.5 mmol) of aminopropyltrimethoxysilane (APTrMOS), and the solution was stirred for 1 hour, thereby synthesizing a silane-terminated straight-chain polyamic acid.

A predetermined amount of colloidal silica-dispersed DMAc was dropwise added to the solution and the solution was stirred vigorously. Then, the solution was cast onto a polyester film, and dried at 85° C. for 2 hours, thereby preparing a film in which a straight-chain polyamic acid and colloidal silica show covalent bonding. Five kinds of films with different silica contents (Example 8a: about 0% by weight, Example 8b: about 10% by weight, Example 8c: about 20% by weight, Example 8d: about 30% by weight, and Example 8e: about 40% by weight) were prepared by changing drop volume of colloidal silica. The film was subjected to a heat treatment in a nitrogen atmosphere at 100° C. for 1 hour, at 200° C. for 1 hour, and further at 300° C. for 1 hour, thereby obtaining the film formed of the organic-inorganic polymer hybrid. Each of the films was immersed into HF solution having a concentration of about 15% by weight for about 3 hours to remove the silica. Then, the film was washed with ion-exchange water for 1 hour and subsequently vacuum dehydrated at 100° C. for 12 hours. Accordingly, the intended five kinds of films were obtained.

Each of the resulting films was confirmed to be porous. In addition, by FT-IR measurement, the resulting films were each confirmed to be formed of a hyperbranched polyimide. Physical properties of each of the films are shown in Table 3 below.

Examples 9a to 9e

To a 100 mL three-necked flask equipped with a stirrer, a nitrogen inlet tube, a calcium chloride tube, and a thermometer was added 10 mL of N,N-dimethylacetamide (DMAc), and 0.62 g (3 mmol) of pyromellitic dianhydride (PMDA) was dissolved therein. While this solution was stirring in a nitrogen stream, 0.55 g (2.75 mmol) of oxydianiline (ODA) and 10 mL of DMAc were added to the solution. Then, the solution was stirred at 25° C. for 3 hours, thereby synthesizing an anhydride-terminated straight-chain polyamic acid. To this solution was added 0.09 g (0.5 mmol) of aminopropyltrimethoxysilane (APTrMOS), and the solution was stirred for 1 hour, thereby synthesizing a silane-terminated straight-chain polyamic acid.

A predetermined amount of mixture of tetramethoxysilane (TMOS) and water ($H_2O$) (TMOS: $H_2O$=1:6 [molar ratio]) was added to the DMAc solution of the obtained silane-terminated straight-chain polyamic acid, and the solution was stirred for 24 hours. Then, the solution was cast onto a polyester film. The film was subjected to a heat treatment in a nitrogen atmosphere at 100° C. for 1 hour, at 200° C. for 1 hour, and further at 300° C. for 1 hour, thereby obtaining the film formed of the organic-inorganic polymer hybrid. Five kinds of films with different silica contents (Example 9a: about 0% by weight, Example 9b: about 10% by weight, Example 9c: about 20% by weight, Example 9d: about 30% by weight, and Example 9e: about 40% by weight) were prepared.

Each of the films was immersed into HF solution having a concentration of about 15% by weight for about 3 hours to remove silica. Then, the film was washed with ion-exchange water for 1 hour and subsequently vacuum dehydrated at 100° C. for 12 hours. Accordingly, intended four kinds of films were obtained.

Each of the resulting films was confirmed to be porous. In addition, by FT-IR measurement, the resulting films were each confirmed to be formed of a hyperbranched polyimide. The resulting films each formed of the porous hyperbranched polyimide had excellent transparency, although the color thereof was yellowish.

TABLE 3

|  | Porosity [%] | $T_d^5$ [° C.] | CTE [ppm/° C.] | Light Transmittance [%] | E [GPa] | σ [MPa] | ε [%] |
|---|---|---|---|---|---|---|---|
| Example 7a | 0 | 490 | 57 | 86 | 2.4 | 128 | 13 |
| Example 7b | 14 | 486 | 62 | 85 | 2.0 | 84 | 9 |
| Example 7c | 21 | 483 | 62 | 84 | 1.8 | 59 | 9 |
| Example 7d | 30 | 482 | 69 | 84 | 1.5 | 44 | 7 |
| Example 7e | 39 | 464 | 70 | 89 | 1.4 | 44 | 8 |
| Example 7f | 49 | 466 | 78 | 85 | — | — | — |
| Example 8a | 0 | 514 | 55 | 82 | — | — | — |
| Example 8b | 7 | 510 | 56 | 1 | — | — | — |
| Example 8c | 14 | 505 | 54 | 1 | — | — | — |
| Example 8d | 21 | 505 | 56 | 1 | — | — | — |
| Example 8e | 30 | 501 | 79 | 0 | — | — | — |
| Example 9a | 0 | 538 | — | 81 | 2.2 | 102 | 39 |
| Example 9b | 7 | 542 | — | 80 | 1.9 | 79 | 25 |
| Example 9c | 14 | 531 | — | 76 | 1.7 | 70 | 18 |
| Example 9d | 21 | 527 | — | 73 | 1.6 | 65 | 16 |
| Example 9e | 30 | 517 | — | 68 | 1.5 | 64 | 10 |

Comparative Examples 1a to 1e

To a 100 mL three-necked flask equipped with a stirrer, a nitrogen inlet tube, a calcium, chloride tube, and a thermometer was added 40 mL of N,N-dimethylacetamide (DMAc), and 1.3 g (3 mmol) of 4,4'-(hexafluoroisopropylidene)diphthalic dianhydride (6FDA) was dissolved therein. While the solution was stirred in a nitrogen stream, 0.64 g (3 mmol) of 1,3,5-tris(4-aminophenoxy)benzene (TAPOB) previously dissolved in 20 mL of DMAc was gradually added. Then, the solution was stirred at 25° C. for 3 hours to synthesize an anhydride-terminated hyperbranched polyamic acid. To the resulting DMAc solution of the anhydride-terminated hyperbranched polyamic acid was dropwise added a predetermined amount of colloidal silica-dispersed DMAc, and the solution was stirred vigorously. Then, the DMAc solution of the silane-terminated hyperbranched polyamic acid was cast onto a polyester film, and dried at 85° C. for 2 hours, thereby preparing a film formed of the hyperbranched polyamic acid and the colloidal silica. Five kinds of films with different silica contents (Comparative Example 1a: about 0% by weight, Comparative Example 1b: about 10% by weight, Comparative Example 1c: about 20% by weight, Comparative Example 1d: about 30% by weight, and Comparative Example 1e: about 40% by weight) were prepared by changing drop volume of Colloidal silica-dispersed DMAc. The film was subjected to a heat treatment in a nitrogen atmosphere at 100° C. for 1 hour, at 200° C. for 1 hour, and further at 300° C. for 1 hour, thereby obtaining five kinds of films formed of the mixture of hyperbranched polyimide and colloidal silica.

Each of the films was immersed into HF solution having a concentration of about 15% by weight for about 3 hours to remove the silica. Then, the film was washed with ion-exchange water for 1 hour and subsequently vacuum dehydrated at 100° C. for 12 hours. Accordingly, porous hyperbranched polyimide films were obtained. Porosity of each film was as follows: Comparative Example 1a: 0%, Comparative Example 1b: 6.6%, Comparative Example 1c: 13.7%, Comparative Example 1d: 21.4%, and Comparative Example 1e: 29.8%. By FT-IR measurement, each of the resulting films was confirmed to be a hyperbranched polyimide. However, mechanical strength and film formability thereof were low, because the hyperbranched polyimide was not obtained by using an organic-inorganic polymer hybrid which has a molecular structure in which a polyimide phase and a silica phase are held together by covalent bond. As a result, it was very difficult to prepare a sample having silica content of 40% or more by weight. In addition, all of the resulting films were somewhat opaque and transparencies thereof were poor.

What is claimed is:

1. A porous polyimide obtained by removing a silica phase from an organic-inorganic polymer hybrid having a molecule structure in which a polyimide phase and the silica phase are held together by covalent bond, wherein the polyimide phase has a dendritic structure in at least a part thereof.

2. The porous polyimide according to claim 1, wherein the organic-inorganic polymer hybrid is obtained through imidization of a polyamic acid-silica hybrid in which a polyamic acid having at least one of a hydroxyl group and an alkoxysilyl group in at least a part of a plurality of end groups thereof and silica particles which is equivalent to the silica phase are held together by covalent bond.

3. The porous polyimide according to claim 2, wherein the polyamic acid is obtained by reaction of a tetracarboxylic dianhydride with at least one of a diamine and a triamine and with a silane coupling agent having an alkoxysilyl group.

4. The porous polyimide according to claim 1, wherein the organic-inorganic polymer hybrid is formed through imidization of a reaction product obtained via sol-gel reaction of a polyamic acid having at least one of a hydroxyl group and an alkoxysilyl group in at least a part of a plurality of end groups with an alkoxysilane compound in the presence of water.

5. The porous polyimide according to claim 1, wherein the organic-inorganic polymer hybrid is obtained via sol-gel reaction of a polyimide with an alkoxysilane compound in the presence of water, the polyimide being obtained through imidization of a polyamic acid having at least one of a hydroxyl group and an alkoxysilyl group in at least a part of a plurality of end groups thereof.

6. The porous polyimide according to claim 4, wherein the polyamic acid is obtained by reaction of a tetracarboxylic dianhydride with at least one of a diamine and a triamine and with a silane coupling agent having an alkoxysilyl group.

7. The porous polyimide according to claim 5, wherein the polyamic acid is obtained by reaction of a tetracarboxylic dianhydride with at least one of a diamine and a triamine and with a silane coupling agent having an alkoxysilyl group.

8. A polyimide film comprising the porous polyimide according to claim 1.

9. A polyimide film comprising the porous polyimide according to claim 2.

10. A polyimide film comprising the porous polyimide according to claim 3.

11. A polyimide film comprising the porous polyimide according to claim 4.

12. A polyimide film comprising the porous polyimide according to claim 5.

13. A polyimide film comprising the porous polyimide according to claim 6.

14. A polyimide film comprising the porous polyimide according to claim 7.

* * * * *